United States Patent
Jiang et al.

(10) Patent No.: US 12,160,400 B2
(45) Date of Patent: Dec. 3, 2024

(54) METHOD AND DEVICE FOR INFORMATION DISPLAY, AND METHOD AND DEVICE FOR INFORMATION SENDING

(71) Applicant: Beijing Zitiao Network Technology Co., Ltd., Beijing (CN)

(72) Inventors: Yan Jiang, Beijing (CN); Kun Hai, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/393,550

(22) Filed: Dec. 21, 2023

(65) Prior Publication Data

US 2024/0146670 A1 May 2, 2024

Related U.S. Application Data

(63) Continuation of application No. PCT/CN2022/111700, filed on Aug. 11, 2022.

(30) Foreign Application Priority Data

Aug. 13, 2021 (CN) .......................... 202110930362.0

(51) Int. Cl.
*G06F 15/16* (2006.01)
*G06F 9/451* (2018.01)
*H04L 51/04* (2022.01)

(52) U.S. Cl.
CPC .............. *H04L 51/04* (2013.01); *G06F 9/451* (2018.02)

(58) Field of Classification Search
CPC .......... H04L 51/04; H04L 51/07; G06F 9/451
See application file for complete search history.

(56) References Cited

U.S. PATENT DOCUMENTS

2016/0277335 A1* 9/2016 Cheung .................... H04L 51/04
2017/0288887 A1* 10/2017 Wang ....................... H04W 4/14
(Continued)

FOREIGN PATENT DOCUMENTS

| CN | 108377216 A | 8/2018 |
| CN | 108400924 A | 8/2018 |

(Continued)

OTHER PUBLICATIONS

Office Action for Chinese Patent Application No. 202110930362.0, mailed Mar. 11, 2024, 19 pages.
(Continued)

*Primary Examiner* — John B Walsh
(74) *Attorney, Agent, or Firm* — Astute IP Law Group

(57) ABSTRACT

The application provides a method for information display and a method for information sending. After a first user triggers an information display instruction for a first emoticon, a terminal device can display information about at least one second user to the user. The second user is a user who quickly replies to a target message with the first emoticon, and a number of at least one second user is no more than a first preset number. In this way, the terminal device displays information about a first preset number of second users to the first user at most. It can be seen that no matter how many users quickly replies to the target message with the first emoticon, the terminal device will only display information about a first preset number of second users at most.

20 Claims, 5 Drawing Sheets

(56) References Cited

U.S. PATENT DOCUMENTS

2017/0331769 A1     11/2017  Curry et al.
2018/0255007 A1*     9/2018  Ji ........................... H04L 51/04
2018/0316636 A1     11/2018  Kamat et al.
2022/0413625 A1*    12/2022  Yang .................. G06F 3/04886

FOREIGN PATENT DOCUMENTS

| | | |
|---|---|---|
| CN | 109117068 A | 1/2019 |
| CN | 109871165 A | 6/2019 |
| CN | 109977310 A | 7/2019 |
| CN | 110147188 A | 8/2019 |
| CN | 110658960 A | 1/2020 |
| CN | 111246275 A | 6/2020 |
| CN | 111614544 A | 9/2020 |
| CN | 111756917 A | 10/2020 |
| CN | 112118169 A | 12/2020 |
| CN | 112291134 A | 1/2021 |
| CN | 112350924 A | 2/2021 |
| EP | 3754912 A1 | 12/2020 |
| WO | 2020/156379 A1 | 8/2020 |
| WO | 2020/220776 A1 | 11/2020 |
| WO | 2021/057595 A1 | 4/2021 |

OTHER PUBLICATIONS

Stormkid, "Implementation of custom controls for displaying more text by clicking", Click to display more text custom controls—Jianshu, Available on internet at: https://www.jianshu.com/p/ed9bb6bec3e7, 2017, 22 pages.

* cited by examiner

METHOD AND DEVICE FOR INFORMATION DISPLAY, AND METHOD AND DEVICE FOR INFORMATION SENDING

CROSS-REFERENCE TO RELATED APPLICATIONS

The present application is a continuation of International Patent Application No. PCT/CN2022/111700, filed on Aug. 11, 2022, which claims priority of Chinese Patent Application No. 202110930362.0, filed on Aug. 13, 2021. All the aforementioned patent applications are hereby incorporated by reference in their entireties.

TECHNICAL FIELD

The present application relates to the field of computers, and in particular, to a method and device for information display, and a method and device for information sending.

BACKGROUND

With the development of computer technology, Instant Messaging (IM) technology has become a mainstream application direction on the Internet. Instant messaging refers to a real-time message interaction between two or more instant messaging users through the Internet and instant messaging software. Instant messaging group is an important application of instant messaging technology, and can provide instant messaging services for multiple instant messaging users. Messages sent by users in an instant messaging group can be seen by any instant messaging user in the instant messaging group, thus realizing instant messaging between multiple instant messaging users.

In order to facilitate user communication, instant messaging groups currently have the function of quick reply with an emoticon. When using the function of quick reply with an emoticon, users can choose to quickly reply to an instant messaging message with an emoticon. The emoticon is displayed in an area corresponding to the instant messaging message, so that other users in an instant messaging group know that users replied to the instant messaging message with the emoticon.

If multiple instant messaging users in an instant messaging group replied to the same message with the same emoticon, the instant messaging software will display relevant information about each of the multiple instant messaging users. However, when there are a large number of users included in the instant messaging group, this traditional method may have a relatively poor display effect, with too great pressure on a server side.

SUMMARY

In order to solve problems in the prior art, in embodiments of the present application are provided a method and device for information display, and a method and device for information sending.

In a first aspect, an embodiment of the present application provides a method for information display, comprising:
acquiring an information display instruction triggered by a first user for a first emoticon, with the first emoticon being an emoticon for a quick reply to a target message; and
displaying information about at least one second user, according to the information display instruction, with the second user being a user who quickly replies to the target message with the first emoticon, and with a number of the at least one second user being no more than a first preset number;
wherein when the first user quickly replies to the target message with the first emoticon, the at least one second user includes the first user; and when the first user does not quickly reply to the target message with the first emoticon, the at least one second user does not include the first user.

In a second aspect, an embodiment of the present application provides a method for information sending, comprising:
in response to a change in a candidate user set, determining a target information set containing information about at least one target user, from the candidate user set, wherein the candidate user set includes users in a target instant messaging group, who quickly replies to a target message with a first emoticon, and the target user quickly replies to the target message with the first emoticon earlier than non-target users in the candidate user set, with a number of the at least one target user being no more than a first preset number; and
sending the target information set to a client side of a first user in the target instant messaging group.

In a third aspect, an embodiment of the present application provides a device for information display, wherein the device is applied to a terminal device and comprises: an acquisition module, configured to acquire an information display instruction triggered by a first user for a first emoticon, with the first emoticon being an emoticon for a quick reply to a target message; and a display module, configured to display information about at least one second user according to the information display instruction, with the second user being a user who quickly replies to the target message with the first emoticon, and with a number of the at least one second user being no more than a first preset number, wherein when the first user quickly replies to the target message with the first emoticon, the at least one second user includes the first user; and when the first user does not quickly reply to the target message with the first emoticon, the at least one second user does not include the first user.

In a fourth aspect, an embodiment of the present application provides a device for information sending, wherein the device applied to a server and comprises: a determination module, configured to in response to a change in a candidate user set, determine a target information set containing information about at least one target user, from the candidate user set, wherein the candidate user set includes users in a target instant messaging group, who quickly replies to a target message with a first emoticon, and the target user quickly replies to the target message with the first emoticon earlier than non-target users in the candidate user set, with a number of the at least one target user being no more than a first preset number; and a sending module, configured to send the target information set to a client side of a first user in the target instant messaging group.

In a fifth aspect, an embodiment of the present application provides an electronic device, comprising: one or more processors; a memory for storing one or more programs, wherein when the one or more programs are executed by the one or more processors, the one or more processors are enabled to implement the method for information display or the method for information sending according to any embodiment of the application.

In a sixth aspect, an embodiment of the present application provides a computer-readable storage medium in which computer programs are stored, wherein the programs, when executed by a processor, implement the method for information display or the method for information sending according to any embodiment of the application.

In a seventh aspect, an embodiment of the present application provides a computer program product, comprising computer programs carried in a non-transitory computer-readable medium, wherein the computer programs contain program codes for executing the method for information display or the method for information sending according to any embodiment of the application.

In embodiments of the present application are provided a method for information display and a method for information sending. After a first user triggers an information display instruction for a first emoticon, a terminal device can display information about at least one second user to the user. The second user(s) is/are a user/users who quickly replies to a target message with the first emoticon, and a number of at least one second user is no more than a first preset number. In this way, the terminal device displays information about a first preset number of second users to the first user at most. It can be seen that no matter how many users quickly replies to the target message with the first emoticon, the terminal device will only display information about a first preset number of second users at most. In this way, a number of information about users displayed in the terminal device is controlled, without affecting user experiences. In addition, in methods provided in embodiments of the present application, a server does not send information about too many users to the terminal device, nor does it need to determine the time for the first user to quickly reply to the target message with the first emoticon, thus reducing the pressure on a server side.

BRIEF DESCRIPTION OF DRAWINGS

In order to explain embodiments of the present application or technical solutions in the prior art more clearly, the accompanying drawings needed to be used in the description of the embodiments or the prior art will be briefly introduced below. Obviously, the accompanying drawings in the following description are only some embodiments recorded in the present application, and those skilled in the art can also obtain other accompanying drawings according to these accompanying drawings, without creative labor made.

DETAILED DESCRIPTION OF THE EMBODIMENTS

Figure 1A:
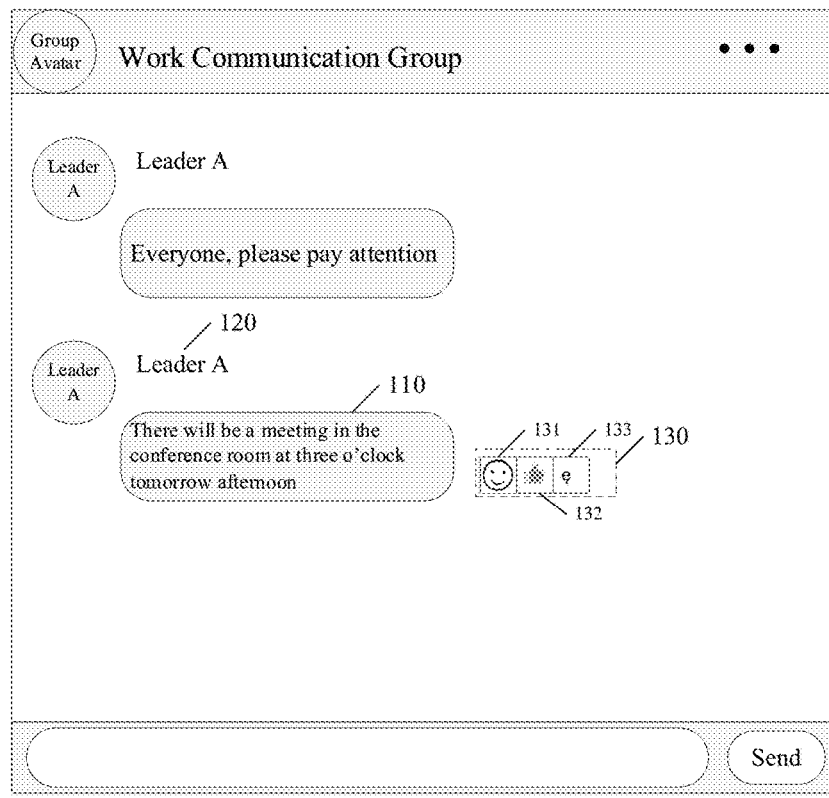
FIG. 1A is a schematic diagram of a display interface of a client side provided in the present application.

Embodiments of the present application will be described in more detail below with reference to the accompanying drawings. Although certain embodiments of the present application are shown in the accompanying drawings, it should be understood that the present application may be embodied in various forms and should not be construed as being limited to the embodiments explained herein, but rather these embodiments are provided for understanding the present application more thoroughly and completely. It should be understood that the accompanying drawings and embodiments of the present application are only for illustrative purposes and are not intended to limit the protection scope of the present application.

It should be understood that the various steps described in method embodiments of the present application can be executed in different orders and/or in parallel. Furthermore, the method embodiments may include additional steps and/or or omit performing illustrated steps. The scope of the present application is not limited in this respect.

The term used herein "include/comprise" and its variations are open-ended, and namely, means "including but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that concepts such as "first" and "second" mentioned in the present application are only used to distinguish between different objects, devices, modules or units, and are not used to limit the sequence or interdependence of the functions performed by these devices, modules or units.

It should be noted that the modifications "one" and "multiple" mentioned in the present application are illustrative and not restrictive, and those skilled in the art should understand that they should be understood as "one or multiple", unless otherwise explicitly stated in the context.

Instant messaging groups can support multiple instant messaging users in information interaction with each other in real time, and have been widely used in many fields. For example, users can discuss and communicate through instant messaging groups, and companies can send group notifications or messages to employees through instant messaging groups. Currently, instant messaging software has a quick reply function, and users can quickly reply to an instant messaging message with an emoticon by triggering a corresponding operation. For example, assuming that the user A agrees with views expressed by the user B in the instant messaging message C, the user A can quickly reply to the instant messaging message C with the "Like" emoticon. After the user A quickly replies, the user A, the user B and even other users (if they exist) in the instant messaging group can see the "Like" emoticon and information about the user A in a position corresponding to the instant messaging message C, thereby knowing the attitude of the user A towards the instant messaging message C.

If multiple instant messaging users replied to the same instant messaging message with the same emoticon, a terminal device can display information about multiple instant messaging users in the same area. For example, assuming that the user D also quickly replies to the instant messaging message C with the "Like" emoticon, information about the user D can be displayed behind information about the user A.

In an embodiment of the present application, a user can quickly reply to an instant messaging message with an emoticon by triggering a control. Specifically, during a user's instant messaging through a terminal device, the terminal device can display an interface as shown in FIG. 1A. In the interface shown in FIG. 1A is displayed relevant information about the instant messaging group "Work Communication Group".

Specifically, in a display area of the terminal device can be included an instant messaging message display area 110 and a user information display area 120. The instant messaging message display area 110 can be used to display instant messaging messages, and the user information display area 120 can be used to display relevant information about users who sent instant messaging messages. In the embodiment corresponding to FIG. 1A, the instant messaging message display area 110 and the user information display area 120 indicate that the user "Leader A" sent the instant messaging message "There will be a meeting in the conference room at three o'clock tomorrow afternoon".

In order to quickly reply to the instant messaging message, users can trigger an area corresponding to the instant messaging message. For example, in the embodiment shown in FIG. 1A, in order to quickly reply to the instant messaging message "There will be a meeting in the conference room at three o'clock tomorrow afternoon", a user can move a cursor to the instant messaging message display area 110, or click on the instant messaging message display area 110. According to the operation triggered by the user, a quick reply box 130 can be displayed. The quick reply box 130 can include a first emoticon reply control 131, a second emoticon reply control 132 and an emoticon display control 133.

If a user wants to quickly reply with the "Smiley face" emoticon to the instant messaging message "There will be a meeting in the conference room at three o'clock tomorrow afternoon", the user can trigger a click operation of the first emoticon reply control 131; if a user wants to reply with the "Like" emoticon to the instant messaging message "There will be a meeting in the conference room at three o'clock tomorrow afternoon", the user can trigger a click operation of the second emoticon reply control 132; and if a user wants to reply with another emoticon to the instant messaging message "There will be a meeting in the conference room at three o'clock tomorrow afternoon", the user can trigger a click operation of the emoticon display control 133. The terminal device can display more optional emoticons according to a click triggered by a user, so that the user can select a corresponding emoticon from the emoticons displayed by the terminal device according to his/her own needs.

Figure 1B:
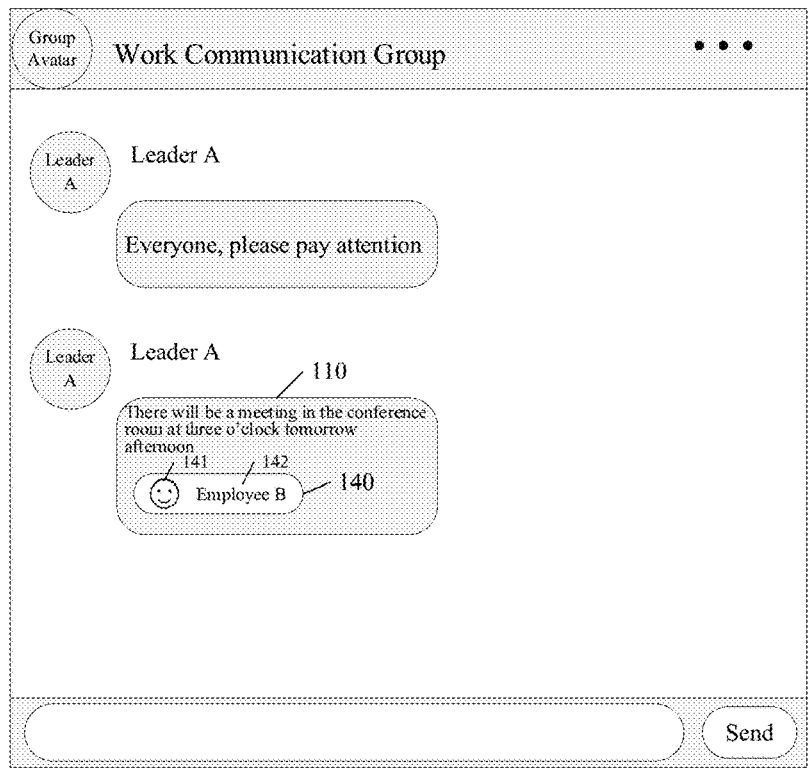
FIG. 1B is another schematic diagram of a display interface of a client side provided in the present application.

Assuming that a user logging in to the terminal device is the "Employee B" and the user clicks on the first emoticon reply control 131, the terminal device can display an interface as shown in FIG. 1B. In FIG. 1B, the instant messaging message display area 110 includes a quick reply display area 140, which is used to display information about users who quickly replies to the instant messaging message "There will be a meeting in the conference room at three o'clock tomorrow afternoon". In an embodiment shown in FIG. 1B, the quick reply display area 140 includes an emoticon display area 141 and a user information display area 142. The emoticon display area 141 is used to display the "Smiley face" emoticon, and the user information display area 142 is used to display information about users who quickly replies to the instant messaging message with the "Smiley face" emoticon. In the embodiment shown in FIG. 1B, the user information display area 142 is used to display information about the "Employee B".

Figure 1C:
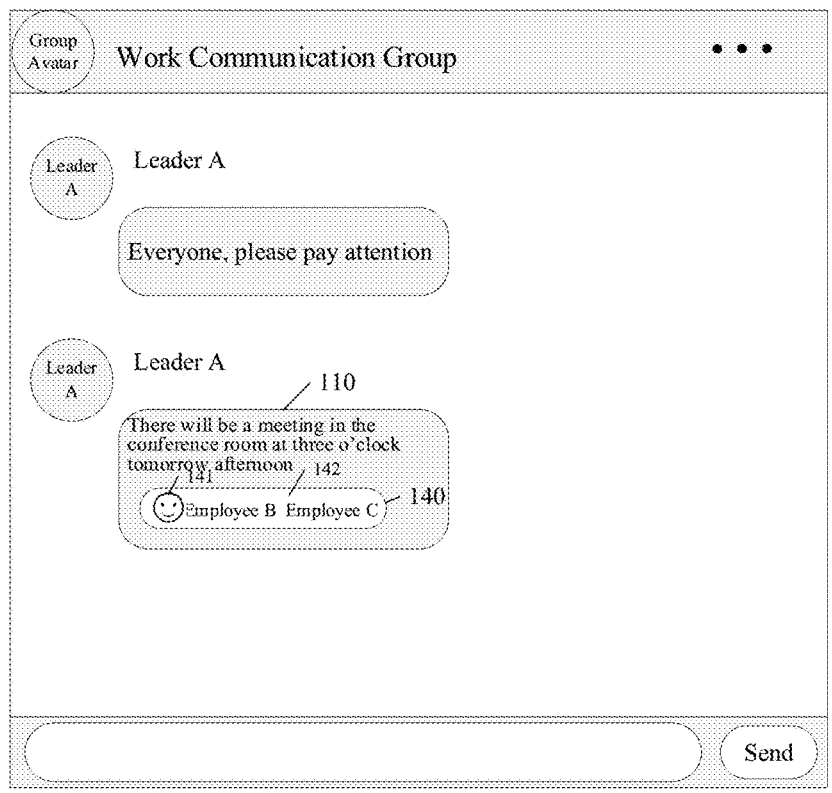
FIG. 1C is another schematic diagram of a display interface of a client side provided in the present application.

If the "Employee C" also quickly replies with the "Smiley face" emoticon to the instant messaging message "There will be a meeting in the conference room at three o'clock tomorrow afternoon", the terminal device can display an interface shown in FIG. 1C. In an embodiment shown in FIG. 1C, the user information display area 142 also displays information about the "Employee C", indicating that the "Employee B" and the "Employee C" quickly replies with the "Smiley face" emoticon to the instant messaging message "There will be a meeting in the conference room at three o'clock tomorrow afternoon".

From the embodiments shown in FIG. 1B and FIG. 1C, it can be seen that current instant messaging software can display in the same area information about multiple instant messaging users who quickly replies to the same instant messaging message with the same emoticon. Therefore, if there are a large number of users who quickly replies to the same instant messaging message with the same emoticon, displaying information about these users may occupy a large display area of the terminal device, thus affecting user experiences. For example, if one thousand users quickly replies with the "Smiley face" emoticon to the instant messaging message "There will be a meeting in the conference room at three o'clock tomorrow afternoon", the terminal device will display information about the one thousand users. Obviously, in this way, the limited display space of the terminal device will be undoubtedly occupied to display information about the users, resulting in a user's need to turn pages multiple times to see other instant messaging messages, which affects user experiences.

In order to solve problems in the prior art, in embodiments of the present application are provided a method for information display and a method for information sending, which will be described in detail below in combination with accompanying drawings of the description.

In order to facilitate the understanding of technical solutions provided in embodiments of the present application, their description will be given below in combination with a scenario example shown in FIG. 2.

Figure 2:
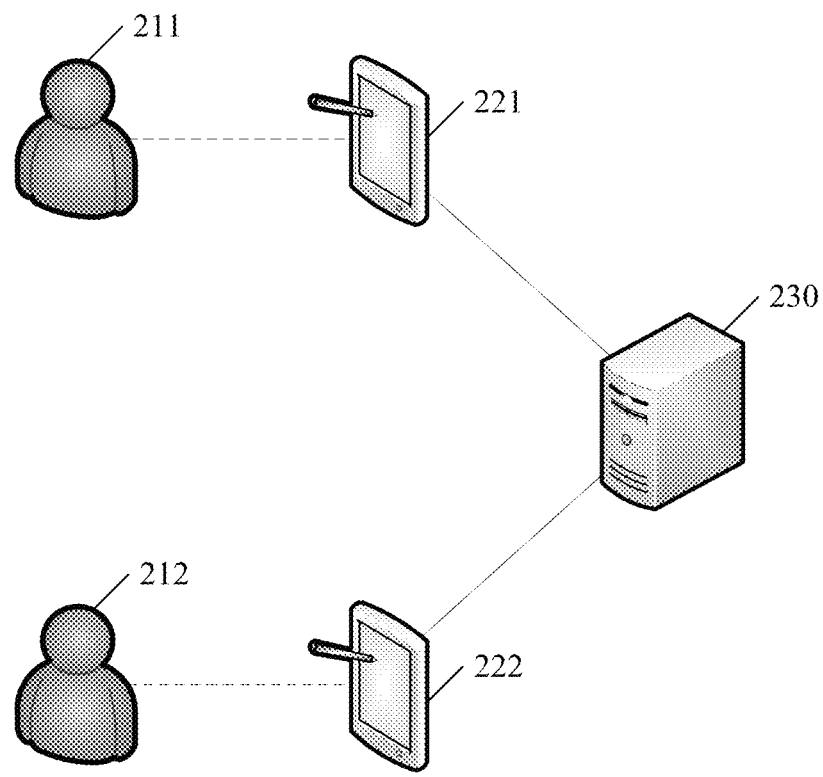
FIG. 2 is a schematic structural diagram of an application scenario provided in an embodiment of the present application.

Refer to FIG. 2, which is a schematic framework diagram of an exemplary application scenario provided in an embodiment of the present application, including a user 211, a user 212, a terminal device 221, a terminal device 222, and a server 230. The user 211 can have a message interaction through the terminal device 221, and the user 212 can have an information interaction through the terminal device 222. The terminal device 221 and the terminal device 222 are respectively connected to the server 230. The user 211 can send an instant messaging message to the terminal device 222 through the terminal device 221. The user 212 can see the instant messaging message sent by the user 211 through terminal device 222, and quickly reply to the instant messaging message.

In the embodiment of the present application, the terminal device can be, for example, a mobile phone, a computer, or other terminal devices, and can also be other terminal devices capable of running instant messaging software. The server can be, for example, a backend server of instant messaging software.

Figure 3:
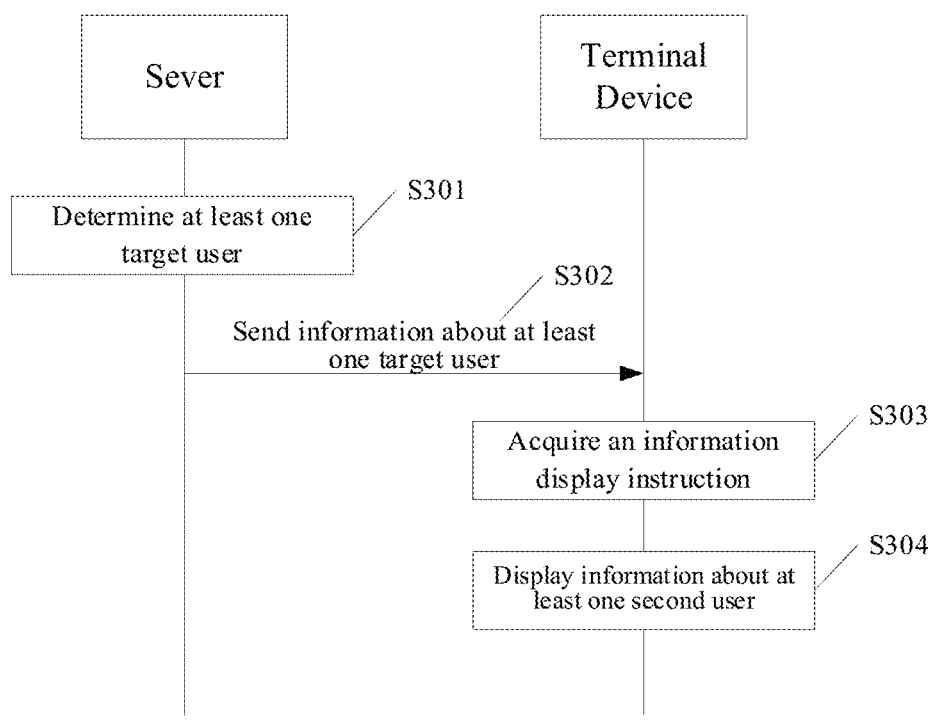
FIG. 3 is a diagram of an information interaction in a method for information display and a method for information sending provided in the present application.

FIG. 3 is a diagram of an information interaction in a method for information display and a method for information sending provided in embodiments of the present application. The embodiment of the present application can be applied to a scenario where a user quickly replies to an instant messaging message. The method for information display can be executed by a device for information display, which can be implemented in the form of software and be integrated into a client side of a user. The client side can be a software one, and can be integrated into a Personal Computer (PC) terminal or a mobile terminal, and for example, can be integrated into the terminal device 221 or the terminal device 222 in FIG. 2. In some possible implementations, the client side can be instant messaging software installed in a terminal device. The method for information sending can be executed by a device for information sending which can be implemented in the form of software and be integrated into a server. The server can be, for example, the server 230 in FIG. 2. As shown in FIG. 3, the method specifically comprises the following steps:

S301: In response to a change in a candidate user set, a server determining at least one target user from the candidate user set.

In the embodiment of the present application, the server can be a backend server of instant messaging software, and is used to process each instant messaging message in the instant messaging software. Data processing related to a target instant messaging group is executed by the server.

When there is a change in the candidate user set, the server can determine at least one target user from the candidate user set. The candidate user set includes at least one user who quickly replies to a target message with a first emoticon, the target message is an instant messaging message in the target instant messaging group, and the first emoticon is an emoticon for a quick reply to the target message. For example, assuming that the target message is the instant messaging message "There will be a meeting in the conference room at three o'clock tomorrow afternoon" shown in FIG. 1B, the first emoticon can be the "Smiley face" emoticon; and the user who quickly replies to the target message with the first emoticon, can be the "User B", and can also be any other user in the instant messaging group, for example, the "Leader A" or the "User C".

That is to say, the candidate user set is a set including users who quickly replies to the target message with the first emoticon. The target user is a user of the candidate user set, and the target user quickly replies to the target message with the first emoticon earlier than a non-target user of the candidate user set.

In the embodiment of the present application, the maximum number of the at least one target user does not exceed a first preset number. The first preset number is the maximum number of users who quickly replies to the target message with the first emoticon and can be displayed by the terminal device. Correspondingly, after determining that there is a change in the candidate user set, the server can acquire the total number of users in the candidate user set and determine whether the number is more than the first preset number. If the number is more than the first preset number, the server can select from all the users who quickly replies to the target information with the first emoticon, a first preset number of users who did so earlier, as target users.

If the total number of users in the candidate user set is less than the first preset number, it means that there are relatively fewer users who quickly replies to the target information with the first emoticon. Even if information about all the users in the candidate user set is sent to the terminal device and is displayed by the terminal device, user experiences will not be affected. Therefore, the server can determine that all the users in the candidate user set are target users.

If the total number of users in the candidate user set is more than the first preset number, it means that there are more users who quickly replies to the target information with the first emoticon. If the server sends information about all the users in the candidate user set to the terminal device and the information is displayed by the terminal device, too many display controls of the terminal device can be occupied, thus affecting user experiences. Therefore, the server can select a first preset number of users as target users from the candidate user set.

For example, the first preset number can be 100, which means that in the terminal device can be displayed information about at most 100 users who quickly replies to the target message with the first emoticon. Therefore, if a number of users in the candidate user set exceeds 100, the server can select from the candidate user set, the first 100 users who quickly replies to the target message with the first emoticon, as target users.

In the embodiment of the present application, a change in the candidate user set can be triggered by other users in the target instant messaging group. For example, it can be triggered by operations of other users in the target instant messaging group quickly replying to the target message with the first emoticon.

An exemplification is given below. If a third user belongs to the target instant messaging group and quickly replies to the target message with the first emoticon, it is possible to cause a change in the candidate user set stored in the server, and for example, the third user can be added to the candidate user set. Next, the server can determine that there is a change in the candidate user set, thereby determining at least one target user.

After determining at least one target user, the server can acquire information about each of the at least one target user. In a possible implementation mode, information about the target user can include any one or more of the following: the username for the target user, the avatar of the target user, and the signature information about the target user.

S302: The server sending information about the at least one target user to the terminal device.

After determining the at least one target user, the server can send information about the at least one target user to the terminal device. The terminal device is a terminal device corresponding to a first user, and the first user belongs to the target instant messaging group. For example, assuming that the server is the server 230 in FIG. 2, the terminal device can be, for example, the terminal device 221 in FIG. 2, the user 211 can log in to the instant messaging software through the terminal device 221, and the account of the user 211 in the instant messaging software belongs to the target instant messaging group.

If the first user also quickly replies to the target information with the first emoticon, the server can also send information about the first user to the terminal device. If a number of users who quickly replies to the target information with the first emoticon is more than the first preset number, the server can send information about a first preset number of target users and information about the first user to the terminal device.

From the foregoing introduction, it can be seen that the at least one target user selected by the server is one or more instant messaging users in the candidate user set who quickly replies to the target message with the first emoticon earliest. In some possible implementation modes, the at least one target user may include the first user. In this situation, the server can send information about the at least one target user and information about the first user to the terminal device. That is to say, if the first user quickly replies to the target message with the first emoticon earlier than or at the same time as a certain target user, the server can send information about the first user to the terminal device twice.

An exemplification is given below. Assuming that the first preset number is 100 and the first user is the 50th user who quickly replies to the target message with the first emoticon, the server can send information about the first 100 users who quickly replies to the target message with the first emoticon and information about the first user to the terminal device. The first 100 users who quickly replies to the target message with the first emoticon include the first user.

In this way, no matter when the first user quickly replies to the target message with the first emoticon, the information sent by the server to the first user always includes information about a preset number of users who quickly replies to the target message with the first emoticon earliest and information about the first user. In this way, the terminal device does not need to determine the order in which users quickly replies to the target message with the first emoticon, thus reducing the work pressure of the server.

S303: The terminal device acquiring an information display instruction triggered by the first user for the first emoticon.

In an embodiment of the present application, if there are too many users who quickly replies to the target message with the first emoticon, information about a third preset number of users who can quickly replies to the target message with the first emoticon can be displayed in an interface corresponding to the target instant messaging group. If the first user further triggers other operations, the terminal device can display to the first user information about more users who quickly replies to the target message with the first emoticon. The first preset number is a preset maximum number of second users that the terminal device can display in the interface corresponding to the target instant messaging group. The second user is determined by the terminal device according to the at least one target user sent by the server. For the introduction to the second users, refer to the following, and it will not be repeated herein.

Therefore, in the embodiment of the present application, the operation of triggering the information display instruction can be an operation of jumping to an interface corresponding to the target instant messaging group, or can be also other operations triggered by the first user in the interface corresponding to the target instant messaging group, and their introduction will be given respectively below.

In a first possible implementation mode, the operation of triggering the information display instruction can be an operation of jumping to the interface corresponding to the target instant messaging group.

If the first user performs an operation to instruct the terminal device to display the interface corresponding to the target instant messaging group, the terminal device can consider that a first user triggered the information display operation for the first emoticon, thereby displaying information about the second users on the interface corresponding to the target instant messaging group. In this way, after the terminal device displays the interface of the instant messaging group, the first user can see the target message, the first emoticon and information about at least one second user in the display area of the terminal device.

In a second possible implementation mode, the operation of triggering the information display instruction is other operations triggered by the first user in the interface corresponding to the target instant messaging group.

After the first user enters the instant messaging group, the first user can see a target message, the first emoticon, and information about a third preset number of second users in the display area of the terminal device. In order to see information about more users who quickly replies to the target message with the first emoticon, the first user can trigger the information display instruction through an operation. In a possible implementation mode, the first user's operation can be a click operation of a display control corresponding to the first emoticon.

Figure 1D:
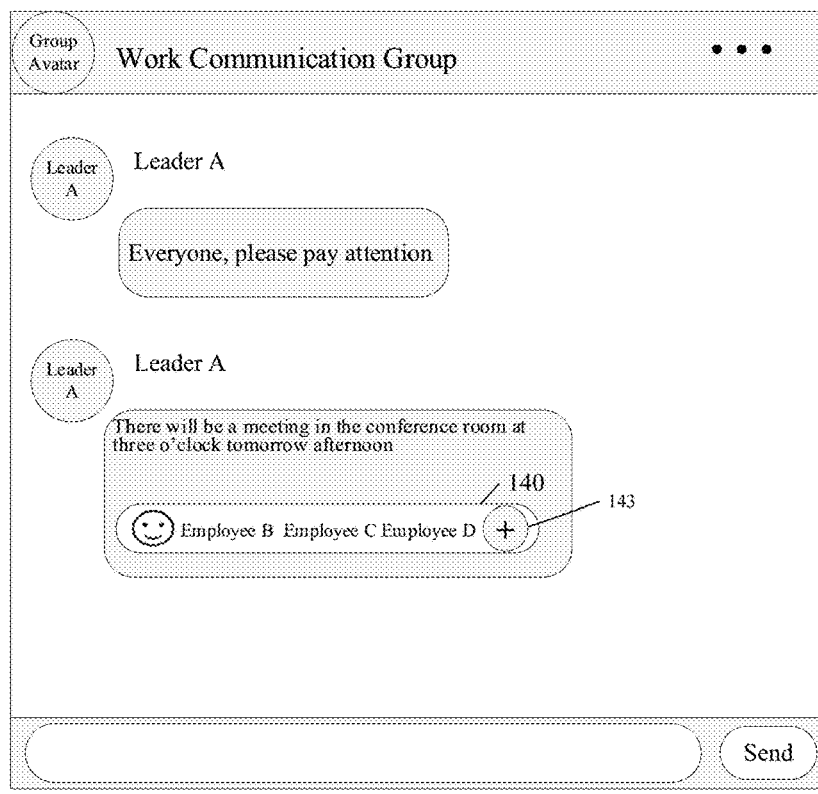
FIG. 1D is another schematic diagram of a display interface of a client side provided in the present application.

An exemplification is given below. Assuming that the third preset number is 3, if the terminal device receives information about more than 3 second users, the terminal device can display the interface as shown in FIG. 1D. In the embodiment shown in FIG. 1D, in the quick reply display area 140 are displayed three users who quickly replies with the "Smiley face" emoticon to the instant messaging message "There will be a meeting in the conference room at three o'clock tomorrow afternoon". In addition, the quick reply display area 140 also includes a display control 143. When the first user clicks on the display control 143, the terminal device can determine the information display instruction triggered by the first user for the first emoticon.

In a possible implementation mode, the first user can also trigger the information display instruction by moving a cursor to a preset area corresponding to the first emoticon. For example, in the embodiment shown in FIG. 1D, if the terminal device detects that the first user moved the cursor to the quick reply display area 140, the terminal device can determine the information display instruction triggered by the first user for the first emoticon.

S304: The terminal device displaying information about at least one second user.

After receiving information about at least one target user sent by the server and acquiring the information display instruction, the terminal device can display information about the at least one second user at a display position corresponding to the first emoticon.

Before displaying information about multiple second users, the terminal device can first determine information about the at least one second user according to information sent by the server. From the foregoing introduction, it can be seen that information sent by the server to the terminal device can include information about the at least one target user, and can also include information about the at least one target user and information about the first user. Specifically, if information sent by the server to the terminal device can include information about the at least one target user, the terminal device can determine that the target user(s) is/are the second user(s), and information about the at least one target user received by the terminal device is information about the at least one displayed second user.

If information sent by the server to the terminal device can include information about the at least one target user and information about the first user, the terminal device can determine whether a number of target users is less than the first preset number. If the number of target users is less than the first preset number, the terminal device can determine that the target user(s) is/are the second user(s) and display information about the at least one second user. In a possible implementation mode, the terminal device can display information about the first user in a forefront of the at least one second user.

If the number of target users is equal to the first preset number, the terminal device can further determine whether a first preset number of target users include the first user. If a first preset number of target users include the first user, the terminal device can determine that the target user(s) is/are the second user(s) and display information about the at least one second user.

If a first preset number of target users does not include the first user, the terminal device can select a second preset number of third users from a first preset number of target users, and can determine that a second preset number of third users and the first user are a first preset number of second users. The second preset number is equal to the first preset number minus one, and a second preset number of third users are a second preset number of users who quickly replies to the target message with the first emoticon earliest, of a first preset number of target users. That is to say, the terminal device can select users who quickly replies to the target message with the first emoticon with earliest, from a first preset number of target users, and determine that the first user and other target users except the excluded users are the second user.

An exemplification is given below. Assuming that the first preset number is 100 and the first user is the 200th user who quickly replies to the target information with the first emoticon, the terminal device can determine the first 99 users who quickly replies to the target message with the first emoticon are the second users and the first user is also the second user.

In the embodiment of the present application, a number of second users does not exceed the first preset number. Therefore, even if there are a large number of users who quickly replies to the target information with the first emoticon, a number of user information displayed by the terminal device will not exceed the first preset number. In this way, a number of user information displayed by the terminal device is controlled, without affecting user experiences.

The method for the terminal device to determine the second users is introduced above, and the method for the terminal device to display the second users will be introduced below.

According to the introduction to S301, the terminal device can display information about a third preset number of second users in the interface of the instant messaging group, and display information about the remaining second users in other interfaces based on operations triggered by a user. The operation triggered by a user can be a click operation of a display control, and also can be an operation of moving a cursor to a preset area corresponding to the first emoticon. The two implementation modes will be introduced in detail below.

In a first possible implementation mode, the operation triggered by a user is a click operation of the display control. After the user triggers the click operation of the display control, the terminal device can display a user information interface, and can display information about the second user in the user information interface.

Specifically, before the first user triggers the click operation of the display control, the terminal device can display information about a third preset number of second users in a first display area. The first display area is a position corresponding to the first emoticon in the instant messaging group interface, and for example, can be the quick reply display area 140 in the embodiment shown in FIG. 1B. In a possible implementation mode, the second users displayed in the first display area can be a third preset number of second users who quickly replies to the target information with the first emoticon earliest, of multiple second users.

An exemplification is given below. Assuming that the third preset number is 5 and there are 100 second users excluding the first user, the terminal device can select 5 second users who quickly replies to the target information with the first emoticon earliest, from the 100 second users, and can display information about the 5 second users in the first display area.

In some possible implementation modes, the first user quickly replies to the target information with the first emoticon, and the terminal device can display the information about the first user in the first display area and can display information about a third preset number of second users in the remaining positions of the first display area. The third preset number is equal to the third preset number minus one, and the second users displayed in the first display area can be a third preset number of second users who quickly replies to the target information with the first emoticon earliest, of multiple second users. In a possible implementation mode, information about the first user can be displayed in front of information about a third preset number of second users.

An exemplification is given below. It is assumed that the third preset number is 5, the terminal device receives information about 100 second users sent by the server, and the first user also quickly replies to the target message with the first emoticon. Then, the terminal device can display information about the first user at the forefront of the first display area, and select 4 second users who quickly replies to the target information with the first emoticon earliest, from the 100 second users, and display information about the 4 second users in the first display area.

In some possible implementation modes, below the target message, there can be multiple display areas which each can correspond to different emoticons. The multiple display areas can include the first display area, which is used to display information about users who quickly replies to the target message with the first emoticon. The multiple display areas can also include a third display area, which is used to display information about users who quickly replies to the target message with a second emoticon.

In a possible implementation mode, the terminal device can also determine the display position of the first user according to the time ordinal number of the first user's quick reply to the target message with the first emoticon. For example, assuming that the first user is the 50th user who quickly replies to the target message with the first emoticon and the first preset number is more than 50, the terminal device can display information about the first user at the 50th position. Assuming that the first user is the 101st user who quickly replies to the target message with the first emoticon and the first preset number is 100, the terminal device can display information about the first user in the last position.

In some possible implementation modes, the terminal device can first display information about a first preset number of second users in the first display area, and then the first user quickly replies to the target message with the first emoticon. In this way, the terminal device can determine a target user who quickly replies to the target message with the first emoticon last, from a first preset number of second users originally displayed in the first display area, and remove information about the target user from the first display area, so that the first display area has enough display space to display information about the first user. In this way, after the first user quickly replies to the target message with the first emoticon, information about the first user is displayed at the forefront of the first display area, and information originally displayed at the back of the first display area is removed, with the remaining information moved backward one position in sequence.

After the first user triggers a display operation of the display control, the terminal device can display the user information interface. The user information interface can be a pop-up window interface for displaying information about multiple second users. In a possible implementation mode, in the user information interface can be displayed information about all the second users acquired by the terminal device. For example, assuming that the server sends information about a first preset number of second users to the terminal device, the terminal device can display information about a first preset number of second users in the user information interface. If the first user quickly replies to the target message with the first emoticon, information about the first user can be displayed at the forefront of the user information interface.

Figure 4:
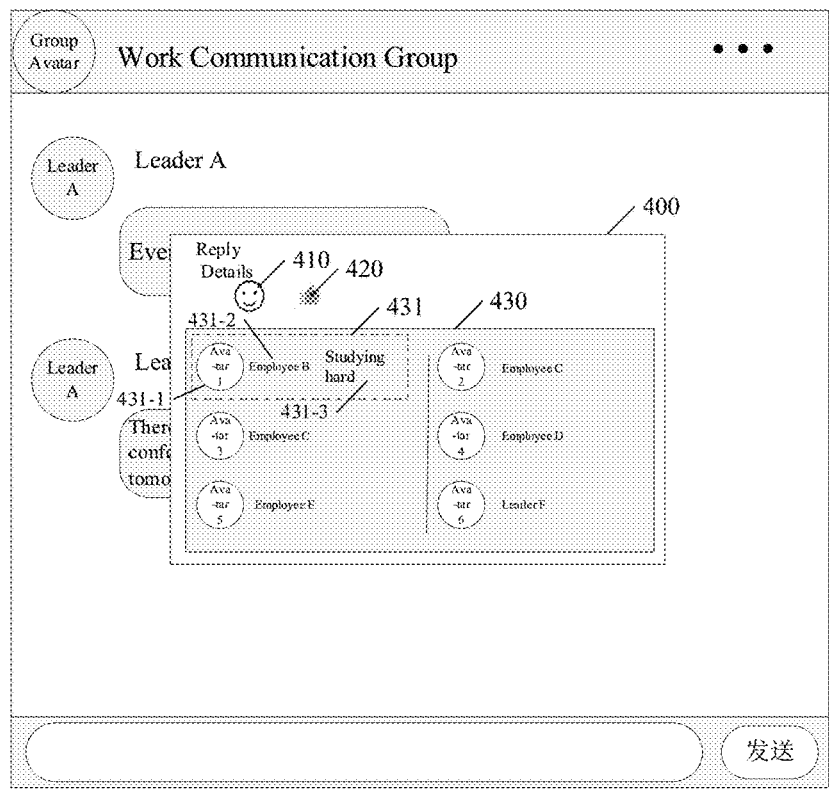
FIG. 4 is another schematic diagram of a display interface of a client side provided in the present application.

When a user triggers a click operation of the display control, the terminal device can display an interface as shown in FIG. 4. Specifically, in the display area of the terminal device can be included a user information interface 400, which includes a first emoticon display area 410, a second emoticon display area 420 and an information display area 430. The first emoticon display area 410 is used to display the first emoticon, and the second emoticon display area 420 is used to display the second emoticon. In a possible implementation mode, a user can have a control on the terminal device's displaying information about users who quickly replies to the target information with the second emoticon, by triggering an operation of the second emoticon display area 420.

The information display area 430 can include at least one user information display area, and for example, can include a first user information display area 431. The first user information display area 431 includes an avatar display area 431-1, a username display area 431-2 and a user signature display area 431-3. In the embodiment shown in FIG. 4, the first user information display area 431 is used to display the avatar, name and signature "Studying hard" of the "Employee B".

In a possible implementation mode, since the first user information display area 431 is located at the forefront of the user display area, the first user information display area 431 can be used to display information about the first user or to display information about a user who quickly replies to the target message with the first emoticon earliest.

In a second possible implementation mode, the operation triggered by a user is an operation of moving a cursor to a preset area corresponding to the first emoticon.

In the embodiment of the present application, the terminal device can detect whether the cursor is located in the preset area corresponding to the first emoticon. When detecting that the cursor is located in the preset area corresponding to the first emoticon, the terminal device can display a supplementary display interface, and display information about second users in the supplementary display interface. The preset area corresponding to the first emoticon can be, for example, the aforementioned first display area.

In a possible implementation mode, second users displayed in the supplementary display interface, can be other second users except second users displayed in the first display area, of the multiple second users. That is to say, the terminal device can select a third preset number of second users from the multiple second users to display them in the first display area, and hide the remaining second users. After a user moves a cursor to the preset area, the terminal device displays the hidden second users to the user. Therefore, in the implementation mode, if the first user also quickly replies to the target message with the first emoticon, information about the first user can be displayed in the first display area instead of the supplementary display interface.

Figure 5:
FIG. 5 is another schematic diagram of a display interface of a client side provided in the present application.

After detecting that a cursor moves to the preset area corresponding to the first emoticon, the terminal device can display an interface as shown in FIG. 5. Specifically, in the display area of the terminal device can be included a supplementary display interface 500, which is used to display information about the "Employee E", "Employee F" and "Employee G". It can be seen from FIG. 5 that the "Employee B" is a user who replied earliest with the "Like" emoticon to the instant messaging message "There will be a meeting in the conference room at 3 p.m. tomorrow", and the "Employee G" is a user who replied last with the "Like" emoticon to the instant messaging message "There will be a meeting in the conference room at 3 p.m. tomorrow".

It should be noted that, without contradiction, a method described in any embodiment of the present application can be combined with a method described in any other embodiment. Moreover, the solutions obtained by the combination are also covered by the protection scope of the embodiments of the present application.

Figure 6:
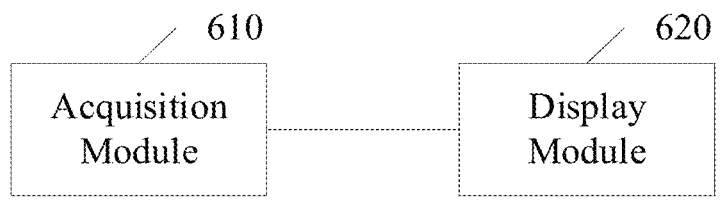
FIG. 6 is a schematic structural diagram of a device for information display provided in an embodiment of the present application.

FIG. 6 is a schematic structural diagram of a device for information display provided in an embodiment of the present application. The embodiment can be applied to a scenario where information about second users is displayed. The device for information display specifically includes: an acquisition module 610 and a display module 620. Specifically, the acquisition module 610 is used to acquire an information display instruction triggered by a first user for a first emoticon, which is an emoticon for a quick reply to a target message. The display module 620 is used to display information about at least one second user according to the information display instruction. The second user(s) is/are a user/users who quickly replies to the target message with the first emoticon. A number of the at least one second user does not exceed a first preset number.

If the first user quickly replies to the target message with the first emoticon, the at least one second user includes the first user; if the first user does not quickly reply to the target message with the first emoticon, the at least one second user does not include the first user.

The device for information display provided in the embodiment of the present application can execute a method for information display provided in any embodiment of the present application, and has functional units and beneficial effects corresponding to the execution of a method for information display.

Figure 7:
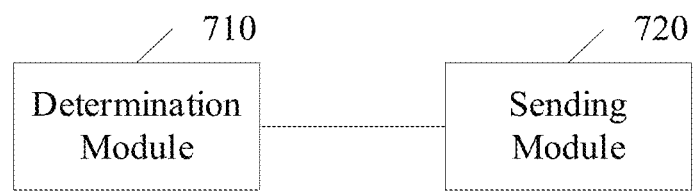
FIG. 7 is a schematic structural diagram of a device for information sending provided in an embodiment of the present application.

FIG. 7 is a schematic structural diagram of a device for information sending provided in an embodiment of the present application. The embodiment can be applied to a scenario where a server sends user information to a terminal device. The device for information sending specifically includes: a determination module 710 and a sending module 720. Specifically, the determination module 710 is used to, in response to a change in a candidate user set, determine a target information set containing information about at least one target user, from the candidate user set; the candidate user set includes users in a target instant messaging group, who quickly replies to the target message with the first emoticon, and the target user(s) quickly replies to the target message with the first emoticon earlier than non-target users in the candidate user set, with a number of the at least one target user being no more than a first preset number; and the sending module 720 is used to send the target information set to a client side of a first user in the target instant messaging group.

The device for information sending provided in the embodiment of the present application can execute a method for information sending provided in any embodiment of the present application, and has functional units and beneficial effects corresponding to the execution of a method for information sending.

It is worth noting that in the above embodiments of the method for information display and the device for information sending, each unit and units included are only divided according to functional logic, but their divisions are not limited to the above divisions, as long as the corresponding functions can be realized; in addition, a specific name of each functional unit is only for the convenience of distinguishing between each other and is not used to limit the protection scope of the present disclosure.

Figure 8:
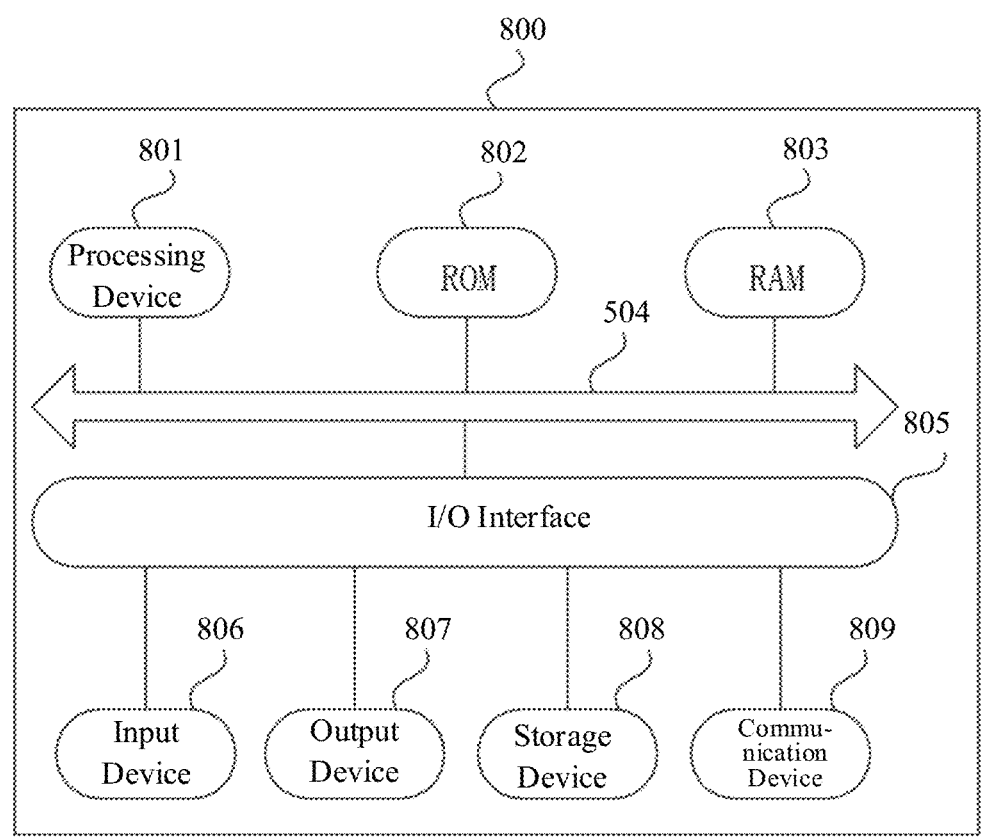
FIG. 8 is a schematic structural diagram of an electronic device provided in an embodiment of the present application.

Refer now to FIG. 8, which is a schematic structural diagram of an electronic device 800 (e.g. a terminal device or server running software programs) suitable for implementing embodiments of the present disclosure. The terminal devices in the embodiments of the present disclosure can include, but are not limited to, mobile phones, notebook computers, digital broadcast receivers, PDAs (Personal Digital Assistants), PADs (tablet computers), PMPs (Portable Multimedia Players), vehicle-mounted terminals (e.g. vehicle-mounted navigation terminals) and other mobile terminals, and digital TVs, desktop computers and other fixed terminals. The electronic device shown in FIG. 8 is only an example and should not impose any limitation on the functions and usage scope of the embodiments of the present disclosure.

As shown in FIG. 8, the electronic device 800 can include a processing device 801 (e.g. central processing unit, graphics processor, etc.), which can perform a variety of appropriate actions and processing, according to programs stored in a read-only memory (ROM) 802 or programs loaded into a random access memory (RAM) 803 from a storage device 808. In the RAM 803 are also stored various programs and data required for the operation of the electronic device 800. The processing device 801, ROM 802 and RAM 803 are connected to each other via a bus 804. An input/output (I/O) interface 805 is also connected to the bus 804.

Generally, the following devices can be connected to the I/O interface 805: an input device 806 including, for example, a touch screen, a touch pad, a keyboard, a mouse, a camera, a microphone, an accelerometer, a gyroscope and the like; an output device 807 including, for example, a liquid crystal display (LCD), a speaker, a vibrator and the like; the storage device 808 including, for example, a magnetic tape, a hard disk and the like; and a communication device 809. The communication device 809 can allow the electronic device 800 to have a wireless or wire communicate with other devices to exchange data. Although FIG. 8 illustrates the electronic device 800 having various devices, it should be understood that it is not required to implement or provide all the illustrated devices. Alternatively more or fewer devices can be implemented or provided.

In particular, according to the embodiments of the present disclosure, the processes described above with reference to the flowchart can be implemented as computer software programs. For example, in an embodiment of the present disclosure is included a computer program product which includes a computer program carried on a non-transitory computer-readable medium, with the computer program containing program codes for performing the method shown in FIG. 3. In such an embodiment, the computer program can be downloaded and installed from the network via the communication device 809, or be installed from the storage device 808, or be installed from ROM 802. When the computer program is executed by the processing device 801, the above functions defined in the methods of the embodiments of the present disclosure are performed.

The electronic device provided in the embodiment of the present disclosure and the method for information display or the method for information sending provided in the above embodiments belong to the same inventive concept; for technical details not described in detail in the embodiment of the present disclosure, refer to the above embodiments; and the embodiment of the present disclosure has the same beneficial effects as the above embodiments. In the embodiment of the present disclosure is provided a computer-readable medium on which a computer program is stored, and when the program is executed by a processor, the method for information displaying or the method for information sending provided in the above embodiments is implemented.

It should be noted that the above computer-readable medium in the present disclosure can be a computer-readable signal medium or a computer-readable storage medium, or any combination thereof. The computer-readable storage medium can be, for example, but is not limited to, an electrical, magnetic, optical, electromagnetic, infrared, or semiconductor system, device or instrument, or any combination thereof. More specific examples of the computer readable storage medium can include, but are not limited to: an electrical connection having one or more wires, portable computer disk, hard disk, Random Access Memory (RAM), Read-Only Memory (ROM), Erasable Programmable Read-Only Memory (EPROM or flash memory), optical fiber, portable Compact Disk Read-Only Memory (CD-ROM), optical storage device, magnetic storage device, or any suitable combination thereof. In the disclosure, the computer-readable storage medium can be any tangible medium that contains or stores programs which can be used by or in combination with an instruction execution system, device or instrument. In the disclosure, the computer-readable signal medium can include data signals propagated in baseband or as part of a carrier wave, which carry computer-readable program codes. Such propagated data signals can take many forms, including but not limited to electromagnetic signals, optical signals, or any suitable combination thereof. The computer-readable signal medium can also be any computer-readable medium other than computer-readable storage media, and can send, propagate or transmit programs which can be used by or in combination with an instruction execution system, device or instrument. The program codes contained in the computer-readable medium can be transmitted by using any suitable medium, including but not limited to: wire, optical fiber cable, radio frequency (RF) and the like, or any suitable combination thereof.

In some implementation modes, a client side and a server can communicate by using any network protocol currently known or developed in the future such as Hypertext Transfer Protocol (HTTP), and can interconnect with any form or medium of digital data communications (e.g. communications network). Examples of communications networks include a local area network ("LAN"), a wide area network ("WAN"), a network of network (e.g. the Internet), and an end-to-end network (e.g. ad hoc end-to-end network), as well as any network currently known or developed in the future.

The above computer-readable medium can be contained in the above electronic device, and can also exist independently without being assembled into the electronic device.

The above computer-readable medium carries one or more programs. When the one or more programs mentioned above are executed by the electronic device, the electronic device is enabled to perform the following steps:

acquiring an information display instruction triggered by a first user for a first emoticon, with the first emoticon being an emoticon for a quick reply to the target message; and displaying information about at least one second user according to the information display instruction, with the second user being a user who quickly replies to the target message with the first emoticon, and with a number of the at least one second user being no more than a first preset number, wherein if the first user quickly replies to the target message with the first emoticon, the at least one second user includes the first user; and if the first user does not quickly reply to the target message with the first emoticon, the at least one second user does not include the first user;

or, the electronic device is enabled to perform the following steps:

in response to a change in a candidate user set, determining a target information set containing information about at least one target user, from the candidate user set, wherein the candidate user set includes users in a target instant messaging group, who quickly replies to the target message with the first emoticon, and the target user(s) quickly replies to the target message with the first emoticon earlier than non-target users in the candidate user set, with a number of the at least one target user being no more than a first preset number; and sending the target information set to a client side of a first user in the target instant messaging group.

The computer-readable storage medium can have computer program codes for performing operations in the present disclosure written in one or more programming design languages or combinations thereof, and the programming design languages include but are not limited to object-oriented programming languages such as Java, Smalltalk, C++, and also include conventional procedural programming design languages such as "C" language or similar programming design languages. The program codes can be executed entirely or partly on a user's computer, be executed as a stand-alone software package, be executed partly on a user's computer and partly on a remote computer, or be executed entirely on a remote computer or server. In situations involving a remote computer, the remote computer can be connected to a user's computer through any kind of network, including a local area network (LAN) or wide area network (WAN), or can be connected to an external computer (such as via Internet connection with the help of an Internet service provider).

The flowchart and block diagrams in the accompanying drawings illustrate the architecture, functions and operations implemented possibly by systems, methods, and computer program products according to various embodiments of the present disclosure. In this regard, each block in the flowchart or block diagrams can represent a module, a program segment, or part of a code, which contains one or more executable instructions for implementing the specified logic functions. It should also be noted that, in some alternative implementations, functions noted in the blocks can occur in a different order from that noted in the accompanying drawings. For example, two blocks shown one after another can actually be executed substantially in parallel, or can sometimes be executed in a reverse order, depending on the functions involved. It will also be noted that each block in the block diagrams and/or flowchart, and combinations thereof, can be implemented by special hardware-based systems that perform the specified functions or operations, or can be implemented by using a combination of special hardware and computer instructions.

The units involved in the description of the embodiments of the present disclosure can be implemented in software or hardware. A name of a unit does not constitute a limitation on the unit itself under certain circumstance. For example, the first processing unit can also be described as "influence factor determination unit".

The functions described above herein can be performed, at least in part, by one or more hardware logic components. For example, without limitation, exemplary types of usable hardware logic components include: Field Programmable Gate Arrays (FPGAs), Application Specific Integrated Circuits (ASICs), Application Specific Standard Products (ASSPs), System on Chips (SOCs), Complex Programmable Logical devices (CPLDs) and so on.

In the context of the disclosure, a machine-readable medium can be a tangible medium that can contain or store programs for use by or in combination with an instruction execution system, apparatus, or device. The machine-readable medium can be a machine-readable signal medium or machine-readable storage medium. The machine-readable medium can include, but is not limited to, an electronic, magnetic, optical, electromagnetic, infrared, or semiconductor system, apparatus or device, or any suitable combination thereof. More specific examples of the machine-readable storage medium include an electrical connection based on one or more wires, portable laptop disk, hard disk, Random Access Memory (RAM), Read-Only Memory (ROM), Erasable Programmable Read-Only Memory (EPROM or flash memory), optical fiber, portable Compact Disk Read-Only Memory (CD-ROM), optical storage device, magnetic storage device, or any suitable combination thereof.

According to one or more embodiments of the present disclosure, [Example 1] is provided a method for information display, comprising: acquiring an information display instruction triggered by a first user for a first emoticon, with the first emoticon being an emoticon for a quick reply to a target message; displaying information about at least one second user, according to the information display instruction, with the second user being a user who quickly replies to the target message with the first emoticon, and with a number of the at least one second user being no more than a first preset number, wherein when the first user quickly replies to the target message with the first emoticon, the at least one second user includes the first user; and when the first user does not quickly reply to the target message with the first emoticon, the at least one second user does not include the first user.

According to one or more embodiments of the present disclosure, [Example 2] is provided a method for information display, which further comprises: in a possible implementation mode, when the first user does not quickly reply to the target message with the first emoticon, before displaying information about at least one second user, the method further comprises: receiving the information about the at least one second user sent by a server.

According to one or more embodiments of the present disclosure, [Example 3] is provided a method for information display, which further comprises: in a possible implementation mode, when the first user quickly replies to the target message with the first emoticon, before displaying information about at least one second user, the method further comprises: receiving information about no more than a first preset number of third users sent by a server, wherein the information about no more than the first preset number of third users is information about at least one second user; or receiving information about a first preset number of third users and information about a first user, sent by a server, and determining the information about the at least one second user based on the information about a first preset number of third users and the information about the first user sent by the server, wherein a number of the at least one second user is equal to the first preset number, and the third users are users who quickly replies to the target message with the first emoticon.

According to one or more embodiments of the present disclosure, [Example 4] is provided a method for information display, which further comprises: in a possible implementation mode, the determining the information about the at least one second user based on the information about a first preset number of third users and the information about the first user sent by the server, comprises: in response to a first preset number of third users excluding the first user, determining target users and a second preset number of non-target users, from a first preset number of third users; determining that the information about the first user and the information about a second preset number of non-target users are the information about the at least one second user, wherein the target users quickly replies to the target message with the first emoticon later than any one of a second preset number of non-target users, and the second preset number is equal to the first preset number minus one; and in response to the first preset number of third users including the first user, determining that the information about the first preset number of third users as the information about the at least one second user.

According to one or more embodiments of the present disclosure, [Example 5] is provided a method for information display, which further comprises: in a possible implementation mode, when the first user quickly replies to the target message with the first emoticon, the displaying information about at least one second user, comprises: displaying information about the first user in the forefront position.

According to one or more embodiments of the present disclosure, [Example 6] is provided a method for information display, which further comprises: in a possible implementation mode, the at least one second user includes a first user, a third preset number of third users and at least one fourth user; the third users quickly replies to the target message with the first emoticon earlier than the fourth user; and the displaying information about at least one second user comprises: displaying the information about the first user at a forefront of a first display area, and displaying information about a third preset number of third users behind the information about the first user.

According to one or more embodiments of the present disclosure, [Example 7] is provided a method for information display, which further comprises: in a possible implementation mode, the displaying information about at least one second user further comprises: displaying information about at least one fourth user in a second display area.

According to one or more embodiments of the present disclosure, [Example 8] is provided a method for information display, which further comprises: in a possible implementation mode, the acquiring an information display instruction triggered by a first user for a first emoticon, comprises: in response to a cursor hovering on a control indicating Displaying More in the first display area, generating the information display instruction triggered by the first user for the first emoticon.

According to one or more embodiments of the present disclosure, [Example 9] is provided a method for information display, which further comprises: in a possible implementation mode, the information display instruction triggered by the first user for the first emoticon comprises: triggering a Displaying More control in a display area corresponding to the first emoticon below the target message; and the displaying information about at least one second user comprises: displaying a user information interface; and displaying the information about the at least one second user in the user information interface.

According to one or more embodiments of the present disclosure, [Example 10] is provided a method for information sending, which comprises: in response to a change in a candidate user set, determining a target information set containing information about at least one target user, from the candidate user set, wherein the candidate user set includes users in a target instant messaging group, who quickly replies to a target message with a first emoticon, and the target user quickly replies to the target message with the first emoticon earlier than non-target users in the candidate user set, with a number of the at least one target user being no more than a first preset number; and sending the target information set to a client side of a first user in the target instant messaging group.

According to one or more embodiments of the present disclosure, [Example 11] is provided a method for information sending, which further comprises: in a possible implementation mode, when the first user is a user who quickly replies to the target message with the first emoticon, the method further comprises: sending to the first user in the target instant messaging group, information about the first user.

According to one or more embodiments of the present disclosure, [Example 12] is provided a device for information display, wherein the device is applied to a terminal device and comprises: an acquisition module, configured to acquire an information display instruction triggered by a first user for a first emoticon, with the first emoticon being an emoticon for a quick reply to a target message; and a display module, configured to display information about at least one second user according to the information display instruction, with the second user being a user who quickly replies to the target message with the first emoticon, and with a number of the at least one second user being no more than a first preset number, wherein when the first user quickly replies to the target message with the first emoticon, the at least one second user includes the first user; and when the first user does not quickly reply to the target message with the first emoticon, the at least one second user does not include the first user.

According to one or more embodiments of the present disclosure, [Example 13] is provided a device for information sending, wherein the device is applied to a server and comprises: a determination module, configured to in response to a change in a candidate user set, determine a target information set containing information about at least one target user, from the candidate user set, wherein the candidate user set includes users in a target instant messaging group, who quickly replies to a target message with a first emoticon, and the target user quickly replies to the target message with the first emoticon earlier than non-target users in the candidate user set, with a number of the at least one target user being no more than a first preset number; and a sending module, configured to send the target information set to a client side of a first user in the target instant messaging group.

According to one or more embodiments of the present disclosure, [Example 14] is provided an electronic device, comprising: one or more processors; and a memory for storing one or more programs, wherein when the one or more programs are executed by the one or more processors, the one or more processors are enabled to implement the method for information display or the method for information sending as described in any one of embodiments of the present application.

According to one or more embodiments of the present disclosure, [Example 15] is provided a computer-readable storage medium in which computer programs are stored, wherein the programs, when executed by a processor, implement the method for information display or the method for information sending as described in any one of embodiments of the present application is implemented.

According to one or more embodiments of the present disclosure, [Example 16] is provided a computer program product, comprising computer programs carried in a non-transitory computer-readable medium, wherein the computer programs contain program codes for executing the method for information display or the method for information sending as described in any one of embodiments of the present application.

The above description is only an explanation of preferred embodiments of the present disclosure and the technical principles applied. Those skilled in the art should understand that the publication scope involved in the present disclosure is not limited to technical solutions composed of the above technical features combined specially, but should also be covered by other solutions composed of the above technical features or equivalent features thereof combined randomly without departing from the above disclosed concept, for example, technical solutions which are formed by mutual replacements of the above features and technical features (but which they are not limited to) with similar functions disclosed in the disclosure.

Furthermore, the description of operations in a specific order should not be understood as requiring that these operations be performed in the specific order shown or performed in a sequential order. Under certain circumstances, multitasking and parallel processing can be advantageous. Likewise, although several specific implementation details are included in the above discussion, these should not be construed as limiting the scope of the present disclosure. Certain features that are described in the context of separate embodiments can also be implemented by being combined in a single embodiment. Conversely, various features that are described in the context of a single embodiment can also be implemented in multiple embodiments separately or in any suitable sub-combination.

Although the subject matter has been described in a language specific to structural features and/or methodological acts, it should be understood that the subject matter defined in the appended claims is not necessarily limited to the specific features or acts described above. Rather, the specific features and acts described above are merely example forms for implementing the claims.

The invention claimed is:

1. A method for information display, comprising:
   acquiring an information display instruction triggered by a first user for a first emoticon, wherein the first emoticon is an emoticon for a quick reply to a target message; and
   displaying information about at least one second user, according to the information display instruction, wherein the second user is a user who uses the first emoticon for the quick reply to the target message a number of the at least one second user is no more than a first preset number, when the first user uses the first emoticon for the quick reply to the target message, the at least one second user includes the first user; and
   when the first user does not use the first emoticon for the quick reply to the target message, the at least one second user does not include the first user.

2. The method according to claim 1, wherein when the first user does not use the first emoticon for the quick reply to the target message, before displaying information about at least one second user, the method further comprises:
   receiving the information about the at least one second user sent by a server.

3. The method according to claim 1, wherein when the first user uses the first emoticon for the quick reply to the target message, before displaying information about at least one second user, the method further comprises:
   receiving information about no more than a first preset number of third users, sent by a server, wherein the information about no more than the first preset number of third users as the information about the at least one second user; or
   receiving information about a first preset number of third users and information about the first user, sent by a server, and determining the information about the at least one second user based on the information about the first preset number of third users and the information about the first user sent by the server, wherein a number of the at least one second user is equal to the first preset number, and the third users are users who use the first emoticon for the quick reply to the target message.

4. The method according to claim 3, wherein the determining the information about the at least one second user based on the information about the first preset number of third users and the information about the first user sent by the server, comprises:
   in response to the first preset number of third users excluding the first user, determining target users and a second preset number of non-target users, from the first preset number of third users;
   and determining that the information about the first user and the information about the second preset number of non-target users are the information about the at least one second user, wherein the target users use the first emoticon for the quick reply to the target message later than any one of a second preset number of non-target users, and the second preset number is equal to the first preset number minus one; and
   in response to the first preset number of third users including the first user, determining that the information about the preset first number of third users as the information about the at least one second user.

5. The method according to claim 1, wherein when the first user uses the first emoticon for the quick reply to the target message, the displaying information about at least one second user, comprises:

displaying information about the first user in a forefront position.

6. The method according to claim 5, wherein the at least one second user includes a first user, a third preset number of third users and at least one fourth user; the third users use the first emoticon for the quick reply to the target message earlier than the fourth user; and the displaying information about at least one second user comprises:
displaying the information about the first user at a forefront of a first display area, and displaying information about a third preset number of third users behind the information about the first user.

7. The method according to claim 6, wherein the displaying information about at least one second user further comprises:
displaying information about at least one fourth user in a second display area.

8. The method according to claim 7, wherein the acquiring an information display instruction triggered by a first user for a first emoticon, comprises:
in response to a cursor hovering on a control indicating Displaying More in the first display area, generating the information display instruction triggered by the first user for the first emoticon.

9. The method according to claim 1, wherein the information display instruction triggered by the first user for the first emoticon comprises:
triggering a Displaying More control in a display area corresponding to the first emoticon below the target message; and
the displaying information about at least one second user comprises:
displaying a user information interface; and
displaying the information about the at least one second user in the user information interface.

10. A method for information sending, comprising:
in response to a change in a candidate user set, determining a target information set containing information about at least one target user, from the candidate user set, wherein the candidate user set includes users in a target instant messaging group who use a first emoticon for a quick reply to the target message, and the target user uses the first emoticon for the quick reply to the target message earlier than non-target users in the candidate user set, wherein a number of the at least one target user being-is no more than a first preset number; and
sending the target information set to a client side of a first user in the target instant messaging group.

11. The method according to claim 10, wherein when the first user is a user who uses the first emoticon for the quick reply to the target message, the method further comprises:
sending to the first user in the target instant messaging group, information about the first user.

12. An electronic device, comprising:
one or more processors; and
a memory for storing one or more programs, wherein when the one or more programs are executed by the one or more processors, the one or more processors are enabled to implement a method for information display, comprising:
acquiring an information display instruction triggered by a first user for a first emoticon, wherein the first emoticon is an emoticon for a quick reply to a target message; and
displaying information about at least one second user, according to the information display instruction,
wherein the second user is a user who uses the first emoticon for the quick reply to the target message, a number of the at least one second user is no more than a first preset number, when the first user uses the first emoticon for the quick reply to the target message, the at least one second user includes the first user; and when the first user does not use the first emoticon for the quick reply to the target message, the at least one second user does not include the first user.

13. The electronic device according to claim 12, wherein when the first user does not use the first emoticon for the quick reply to the target message, before displaying information about at least one second user, the method further comprises:
receiving the information about the at least one second user sent by a server.

14. The electronic device according to claim 12, wherein when the first user uses the first emoticon for the quick reply to the target message, before displaying information about at least one second user, the method further comprises:
receiving information about no more than a first preset number of third users, sent by a server, wherein the information about no more than the first preset number of third users as the information about the at least one second user; or
receiving information about a first preset number of third users and information about the first user, sent by a server, and determining the information about the at least one second user based on the information about the first preset number of third users and the information about the first user sent by the server, wherein a number of the at least one second user is equal to the first preset number, and the third users are users who use the first emoticon for the quick reply to the target message.

15. The electronic device according to claim 14, wherein the determining the information about the at least one second user based on the information about the first preset number of third users and the information about the first user sent by the server, comprises:
in response to the first preset number of third users excluding the first user, determining target users and a second preset number of non-target users, from the first preset number of third users;
and determining that the information about the first user and the information about the second preset number of non-target users are the information about the at least one second user, wherein the target users use the first emoticon for the quick reply to the target message later than any one of a second preset number of non-target users, and the second preset number is equal to the first preset number minus one; and
in response to the first preset number of third users including the first user, determining that the information about the preset first number of third users as the information about the at least one second user.

16. The electronic device according to claim 12, wherein when the first user uses the first emoticon for the quick reply to the target message, the displaying information about at least one second user, comprises:
displaying information about the first user in a forefront position.

17. The electronic device according to claim 16, wherein the at least one second user includes a first user, a third preset number of third users and at least one fourth user; the third users use the first emoticon for the quick reply to the target message earlier than the fourth user; and the displaying information about at least one second user comprises:

displaying the information about the first user at a forefront of a first display area, and displaying information about a third preset number of third users behind the information about the first user.

18. The electronic device according to claim 17, wherein the displaying information about at least one second user further comprises:

displaying information about at least one fourth user in a second display area.

19. The electronic device according to claim 18, wherein the acquiring an information display instruction triggered by a first user for a first emoticon, comprises:

in response to a cursor hovering on a control indicating Displaying More in the first display area, generating the information display instruction triggered by the first user for the first emoticon.

20. A computer-readable storage medium in which computer programs are stored, wherein the programs, when executed by a processor, implement the method for information display according to claim 1.

\* \* \* \* \*

UNITED STATES PATENT AND TRADEMARK OFFICE
CERTIFICATE OF CORRECTION

PATENT NO. : 12,160,400 B2  
APPLICATION NO. : 18/393550  
DATED : December 3, 2024  
INVENTOR(S) : Yan Jiang and Kun Hai Page 1 of 1

It is certified that error appears in the above-identified patent and that said Letters Patent is hereby corrected as shown below:

In the Claims

In Column 22, Line 10-11, Claim 1:  
Reads: "reply to the target message a number of the at least one second user"  
Should read: --reply to the target message, a number of the at least one second user--

Signed and Sealed this  
Eighth Day of April, 2025

Coke Morgan Stewart  
*Acting Director of the United States Patent and Trademark Office*